United States Patent [19]
Heitmann et al.

[11] 4,207,086
[45] Jun. 10, 1980

[54] STREAM FEEDER APPARATUS

[75] Inventors: Arthur C. Heitmann, Newark; Arnold J. Eisenberg, Granville, both of Ohio

[73] Assignee: Owens-Corning Fiberglas Corporation, Toledo, Ohio

[21] Appl. No.: 864,046

[22] Filed: Dec. 23, 1977

[51] Int. Cl.$^2$ ............................................. C03B 37/02
[52] U.S. Cl. ......................................... 65/1; 76/107 S
[58] Field of Search .................. 65/1, 2, 11 R, 11 W, 65/374 M, DIG. 4; 13/6; 76/107 S

[56] References Cited
U.S. PATENT DOCUMENTS

| | | |
|---|---|---|
| 3,972,702 | 8/1976 | McCormick et al. ..................... 65/1 |
| 4,099,948 | 7/1978 | Thomas ..................................... 65/1 |

FOREIGN PATENT DOCUMENTS 1502683  3/1978  United Kingdom .......................... 65/1

Primary Examiner—Robert L. Lindsay, Jr.
Attorney, Agent, or Firm—Ronald C. Hudgens; Philip R. Cloutier; Kenneth H. Wetmore

[57] ABSTRACT

A feeder is provided for supplying molten mineral material in the form of streams. The feeder comprises a bottom wall member, two side wall members and two end region members, each comprising an end wall portion and portions extending from the end wall portion on three sides thereof to form a bottom wall portion and two side wall portions, the bottom wall member and the side wall members being affixed to the bottom wall portion and the side wall portions, respectively.

8 Claims, 5 Drawing Figures

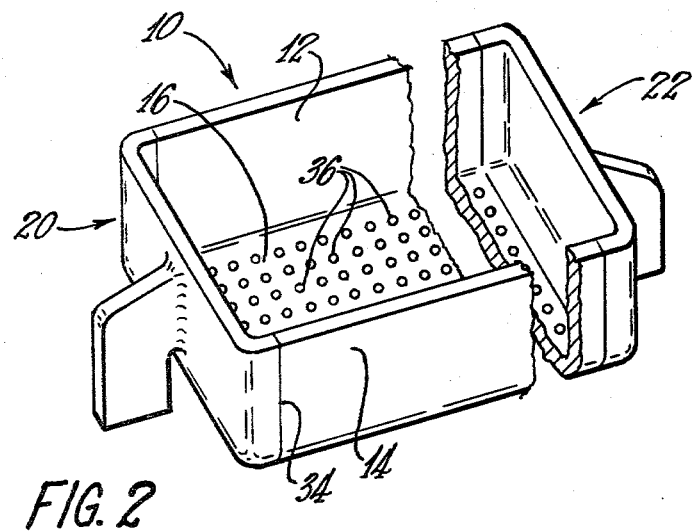
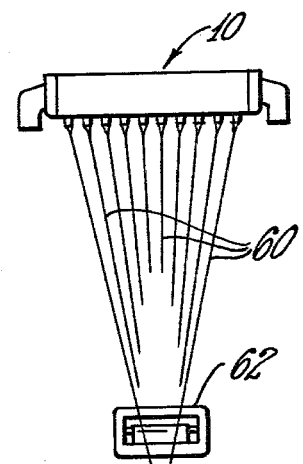
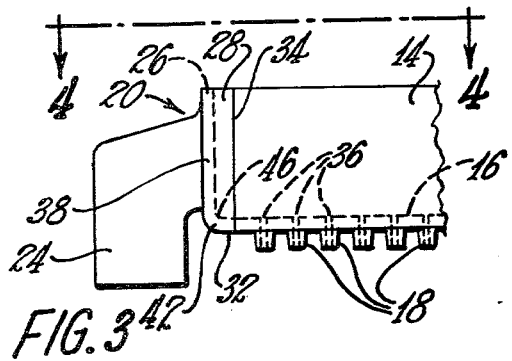
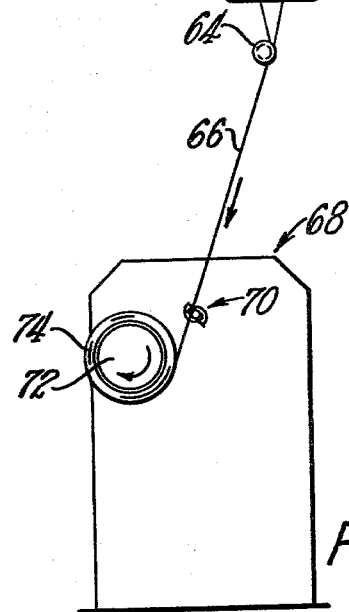
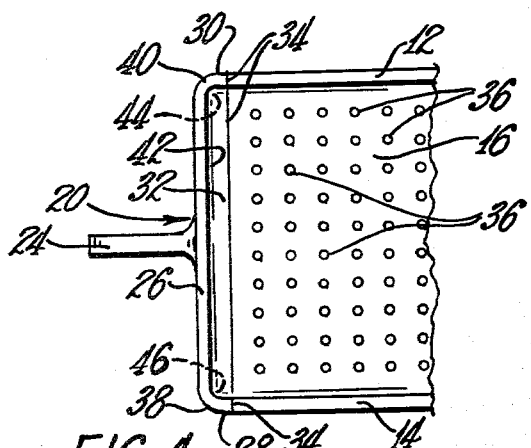
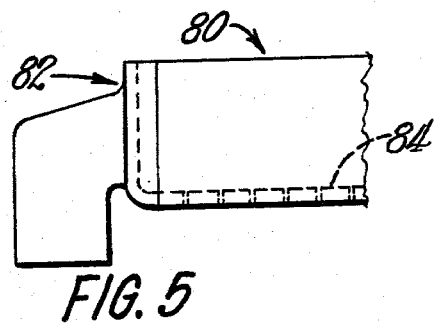

STREAM FEEDER APPARATUS

BACKGROUND OF THE INVENTION

This invention relates to apparatus for melting heat softenable materials and more particularly, to stream feeders or bushings made of platinum, rhodium or other precious metal alloys for producing continuous glass fibers.

Several methods have heretofore been employed in processing glass for forming continuous glass filaments for fibers. One method involves the steps of melting glass in a comparatively large furnace, refining the glass in a refining chamber and forming the glass into spherical bodies or marbles. The glass marbles are subsequently delivered into a stream feeder which is electrically heated to remelt the glass to a viscosity at which the streams of glass may be flowed through orifices in the heater and attenuated into fibers.

The more common method used today is the direct melt process wherein glass batch is reduced to a molten state and refined in a furnace. The molten glass flows from the furnace along a forehearth channel through stream feeders disposed along the forehearth. The feeders are heated by electrical resistance to control glass viscosity. Then, the streams of glass are delivered through orifices in the feeders or bushings for attenuation into fibers.

Both of the above fiber forming processes employ stream feeders or bushings made of high temperature resistant metal alloys such as platinum or rhodium. The stream feeder is a metal container having orifices in its bottom wall through which streams of glass flow for attenuation into fibers. Often, orificed tips, or projections, are attached to the bottom wall through which the glass streams flow. Feeders have typically been manufactured from precut parts which are welded together by conventional fusion welding techniques. The side walls and the bottom walls are positioned against the end wall and welded thereto to form sharp, non-filleted, two-dimensional corners. In this construction, a sharp, non-filleted, three dimensional corner is formed where the side wall, bottom wall and end wall join. Terminals to which electrical bus bars are attached for supplying current through the feeder are welded to both ends of the box shaped feeder. The feeder is then heated by its own electrical resistance.

There are a number of problems with this type of feeder construction. The welding together of many pieces is time consuming and the uniformity of welds can vary. Because of the nature of the fusion weld bead as compared to the sheet material, resistivity is changed through the weld zone and the same heat pattern may be difficult to stabilize or reproduce from feeder to feeder. This can be a particular problem at the sharp corners where one sheet of metal is laid upon another for welding. Also, the weld joining the terminal to the end wall is very important to the feeders performance. If this weld's electrical resistivity varies from feeder to feeder, the feeders will perform differently because of different heating characteristics. Also, if the weld joining the terminal to the end wall is a poor weld, the terminal can burn off from the feeder by electrical arcing causing premature failure of the feeder. The sharp non-filleted corners in this feeder construction can give rise to areas of high stress concentration. An area of high stress concentration at a poor weld joint can cause a leak in the feeder, and thus, premature failure of the feeder.

SUMMARY OF THE INVENTION

The present invention comprises a feeder for supplying molten mineral material in the form of streams comprising a bottom wall member, two side wall members and two end region members, each comprising an end wall portion and portions extending from the end wall portions on three sides thereof to form a bottom wall portion and two side wall portions, the bottom wall member and the side wall members being affixed to the bottom wall portion and the side wall portions respectively.

It is an object of the present invention to provide stream feeders for heat-softened fiber forming materials.

Another object of the present invention is to provide stream feeders which have reduced high stress concentration areas.

An object of the present invention is to provide stream feeders which have more uniform heating characteristics.

Another object of the present invention is to provide improved end region members for stream feeders.

These and other objects of the invention will become apparent as the invention is described hereinafter in detail with reference to the accompanying drawings.

DESCRIPTION OF THE DRAWINGS

FIG. 1 is a front elevational view of a general layout of a fiber forming operation in accordance with the present invention.

FIG. 2 is a generalized isometric view of a stream feeder in accordance with the present invention.

FIG. 3 is a partial elevational view of a stream feeder in accordance with the present invention.

FIG. 4 is a cross-sectional view taken substantially along the line 4—4 of FIG. 3.

FIG. 5 is a partial front elevational view of another stream feeder in accordance with the present invention.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways to produce elements for other end uses. Also, it is to be understood that the phraseology employed herein is for the purpose of description and not of limitation.

Referring now more particularly to the drawings, FIG. 1 illustrates a fiber forming operation. Mineral material such as glass is maintained in a molten condition in the stream feeder or bushing assembly 10 from which a plurality of streams of material is emitted from orifices in the feeder for attenuation into fibers 60. The fibers are gathered into a strand 66 by drawing them over a gathering member 64 while sizing is applied to the fibers by applicator 62 which supplies a sizing to each filament above the point of collection at the gathering member 64. The strand 66 formed of the gathered fibers is packaged by a winder 68 which traverses the strand by a suitable traversing device such as a spiral wire traverse 70 and which collects the strand on a rotating collet 72 into a package 74.

FIG. 2 illustrates a stream feeder or bushing assembly 10 as shown in FIG. 1. The stream feeder is basically a box-shaped member made of high temperature resistant alloys such as platinum, rhodium, or the like. As illustrated in FIG. 2, the bushing assembly has side wall members 12 and 14, bottom wall member 16 having orifices 36 therein and end region members 20 and 22. End region member 20 is similar to end region member 22.

FIGS. 3 and 4 are more detailed views of an end section of the feeder assembly. The bottom member 16 is shown to have orificed tips 18 attached thereto. It is emphasized that a tipped bottom wall is shown as one example and that a bottom wall having a generally planar bottom surface as illustrated in FIG. 5, is included in the scope of the present invention. FIG. 5 shows a tipless feeder assembly 80 having a generally planar bottom wall 84 and having an end region member 82 which is similar to the end region member 20 of FIG. 3. Referring back to FIG. 3, in this embodiment the tipped orifices are shown to be in uniform rows. The bottom wall member and the two side wall members can be made from one or more pieces of metal which are welded together as is conventional in the art. Alternately, these members can be formed from a single piece of metal as is also known in the art. By forming the bottom wall member and the side wall members from a single piece of metal, the number of welds needed to fabricate the feeder is reduced.

The end region assembly 20 is a one piece unit rather than a number of pieces of metal welded together. Such a unit can be produced by conventional precision investment casting.

End region assembly 20 comprises an end wall portion 26 and portions extending from the end wall portion on three sides thereof to form a bottom wall portion 32 and two side wall portions 28 and 30. As shown, the side wall portion 28 extends from the end wall 26 through a radius 38, the side wall portion 30 extends from the end wall 26 through radius 40 and the bottom wall portion 32 extends from the end wall 26 through radius 42. The inside radius can be, for example, 1/16th of an inch and the outside radius can be 1/8th of an inch. The side wall portions and the bottom wall portion generally form 90° filleted corners with the end wall. The three dimensional corner 44 formed by the intersection of the end wall 26, bottom wall portion 32 and side wall portion 30 is a filleted ball corner. The three dimensional corner 46 formed by the intersection of end wall 26 bottom wall portion 32 and side wall portion 28 is a filleted ball corner. By providing a radius in the corners of the end region member 20, high stress concentration areas are reduced as compared to feeders which have sharp, non-filleted 90° corners.

As shown, the length of the side wall portions 28 and 30 is less than the length of the side wall members 14 and 12. It is within the scope of the invention that these lengths can be equal or that the length of the side wall portions can be more than the length of the side wall members. Similarly, the length of the bottom wall portion is shown to be less than relative to the length of the bottom wall member. However, the length of the bottom wall portion and the length of the bottom wall member can be the same or the length of the bottom wall portion can be larger than the length of the bottom wall member.

The terminal 26 is an integral, unitary portion of the end region assembly 20. Thus, the need for a weld to join the terminal to the end wall is eliminated. Because the end region assembly 20 is cast into a single unitary member, an electrical connection through terminal 24 to a body of the feeder will be uniform and reproducable. A weld has been eliminated and the possibility of failure of the feeder because of an electrical terminal burning off, caused by a hot spot from arching due to a bad weld, is reduced.

Bottom wall member 16 and side wall members 12 and 14 are joined to the end region assemblies 20 and 22. The bottom wall member and the side wall members are joined to the bottom wall portions and the side wall portions respectively. These members and portions can be joined by welded joint 34. A continuous butt weld has been found to perform satisfactorily. With a butt weld there are no sharp corners, and thus, the likelihood of a stress concentration area or stress riser causing a leak and subsequent failure of the feeder is reduced.

It will be evident from the foregoing that various modifications can be made to this invention. Such, however, are considered to be within the scope of the invention as described in the following claims.

We claim:
1. A feeder for supplying molten glass material in the form of streams for attenuation into fibers comprising:
   (a) a bottom wall member;
   (b) two side wall members; and
   (c) two end region members, each comprising an end wall having portions extending through filleted corners to form a bottom wall portion and two side wall portions, the bottom wall member and the side wall members being butt welded to the bottom wall portion and the side wall portions respectively.

2. The feeder of claim 1 wherein the length of the side wall portions is less than the length of the side wall members.

3. The feeder of claim 1 wherein the length of the bottom wall portion is less than the length of the bottom wall member.

4. The feeder of claim 1 wherein the two end region members each further comprise a terminal extending from the end wall.

5. The feeder of claim 1 wherein the intersection of each side wall portion with the bottom wall portion and the end wall forms a ball corner.

6. A bushing for use in the production of glass fibers comprising a side wall member and a one piece end member having a portion extending through a filleted corner to form a wall portion, said wall portion being connected to said side wall member by a butt weld.

7. The apparatus of claim 6 wherein the one piece end member has a second portion extending from the end member to form a terminal.

8. A bushing for use in the production of glass fibers comprising a bottom wall member and a one piece end member having a portion extending through a filleted corner to form a bottom wall portion, said wall portion being connected to said bottom wall member by a butt weld.

* * * * *